United States Patent
Ueno

(10) Patent No.: US 8,280,927 B2
(45) Date of Patent: Oct. 2, 2012

(54) ELECTRONIC EQUIPMENT AND MEMORY MANAGING PROGRAM

(75) Inventor: Toshiaki Ueno, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 600 days.

(21) Appl. No.: 12/204,276

(22) Filed: Sep. 4, 2008

(65) Prior Publication Data

US 2009/0100116 A1 Apr. 16, 2009

(30) Foreign Application Priority Data

Oct. 16, 2007 (JP) .................................. 2007-269548

(51) Int. Cl.
*G06F 12/00* (2006.01)
(52) U.S. Cl. .................... 707/816; 707/689; 707/702
(58) Field of Classification Search ................... None
See application file for complete search history.

(56) References Cited

U.S. PATENT DOCUMENTS

| 2003/0140071 A1 | 7/2003 | Kawamoto |
| 2005/0091646 A1* | 4/2005 | Chilimbi et al. ............... 717/130 |
| 2006/0085156 A1* | 4/2006 | Kolawa et al. ................. 702/119 |
| 2007/0083721 A1* | 4/2007 | Grinspan ....................... 711/159 |

FOREIGN PATENT DOCUMENTS

| JP | 06-096165 | 4/1994 |
| JP | 10-097435 | 4/1998 |
| JP | 2001-282614 | 10/2001 |
| JP | 2002-108698 | 4/2002 |

* cited by examiner

*Primary Examiner* — Etienne Leroux
*Assistant Examiner* — Bruce Witzenburg
(74) *Attorney, Agent, or Firm* — Frommer Lawrence & Haug LLP

(57) ABSTRACT

The present invention claims and discloses an electronic equipment capable of executing a processing executing program that performs a predetermined processing. The electronic equipment comprises a memory; a setting unit that sets an allocation time for a memory region in the memory that the processing executing program is to use; and a memory leak detecting unit that detects when the memory region has not been deallocated within the allocation time.

5 Claims, 7 Drawing Sheets

ELECTRONIC EQUIPMENT AND MEMORY MANAGING PROGRAM

INCORPORATION BY REFERENCE

This application is based upon and claims the benefit of priority from the corresponding Japanese Patent Application No. 2007-269548, filed Oct. 16, 2007, the entire contents of which is incorporated herein by reference.

FIELD OF THE INVENTION

The present invention teaches and claims an electronic equipment and a memory managing program.

BACKGROUND OF THE INVENTION

Electronic equipment having a built-in computer, such as personal computers, office equipment and household electrical goods have programs which comprise processing such as data processing and equipment control installed, and the programs are executed by the computer. Thus, various types of described processing are realized.

In such programs, static memory regions are allocated beforehand when the programs are designed and dynamic memory regions are appropriately allocated when the programs are executed. Both are used as memory regions that store data. The dynamic memory region is allocated as needed when a program is executed. Consequently, when a dynamically allocated memory region becomes unnecessary (i.e., when it is not used in later processing), then the memory region is deallocated. By configuring the memory regions in this manner, the storage regions of the memory are utilized efficiently.

FIG. 6 is a flowchart describing allocation and deallocation of a dynamic memory region. When a memory region allocation request is issued (step S101), a memory manager allocates a memory region in response to that request and notifies a device control unit of information such as the starting position of that region (step S103). Then, when the processing using the memory region is completed (step S104), a memory region deallocation request is issued, so the memory manager deallocates the memory region in response to that request.

When C, C++ or the like is used as the programming language and programming is performed, allocation and deallocation of the dynamic memory region is explicitly realized by calling a function within the program.

In language processing systems such as Java®, there is a garbage collection feature in the language processing system, so a programmer does not have to consciously deallocate the memory region.

As mentioned above, when a programming language for which it is necessary to explicitly describe allocation and deallocation of a dynamic memory region, such as C, C++ or the like is used and program design is performed, the programmer must always be aware of the fact that a dynamic memory region that has been allocated will be deallocated at any point in time. When the programmer becomes unable to allocate a new memory region in the place where a dynamic memory region existed, the storage region of the memory that is dynamically allocatable becomes reduced. Usually, this is called a memory leak. For this reason, when a program having a memory leak of a memory region continues to be executed in this manner, the memory leak progresses, until the programmer finally becomes unable to newly allocate the dynamic memory region, and execution of the program ends up stopping.

FIG. 7 is a flowchart describing the occurrence of a memory leak. When a memory region allocation request is issued (step S101), the memory manager allocates a memory region in response to that request and notifies the device control unit of information such as the starting position of that region (step S103). When processing using the memory region is completed (step S104), a memory region deallocation request is not issued (step S111), and then thereafter this region is not used, so the total available dynamically allocatable region becomes reduced. When such a memory leak of the memory region repeatedly occurs, the allocatable region finally becomes insufficient. Then, even when a memory region allocation request is issued (step S101), the memory manager fails to allocate the memory region corresponding to that request (step S102a) and notifies the device control unit of an error result (step S103a). Thus, processing is discontinued (step S104a).

In order to prevent beforehand the occurrence of such a memory leak, the programmer tracks the source code and discovers and eliminates the memory leak of the dynamic memory region. However, ordinarily a program includes numerous conditional branches and types of repetitive processing and has a complex internal structure. While trying to discover and eliminate memory leaks, the programmer tracks the source code while considering under what kind of condition will a memory region be dynamically allocated and under what kind of condition will the memory region be deallocated. This work of discovering and eliminating a memory leak of a dynamic memory region is time consuming. Further, because it is necessary for the programmer to verify the source code while considering various matters in this manner, there is the potential for a memory leak of a memory region to be overlooked and to end up remaining within a program.

In the case of a memory leak that progresses relatively early, a memory leak of a memory region that remains can be discovered during testing before a product is shipped, but in the case of a memory leak that progresses relatively late, there is the potential for a memory leak of a memory region that remains undiscovered during testing before the product is shipped.

Further, in order to utilize a garbage collection feature such as mentioned above, memory management is limited to a relatively high-level language. Oftentimes it is difficult to implement a garbage collection feature in a processing system as in the aforementioned C language, and this is not realistic outside of some language processing systems.

SUMMARY OF THE INVENTION

The present invention has been achieved that remedies the deficiencies discussed above, and it is an object of the present invention thereof to obtain an electronic equipment having a memory managing program that can detect a memory leak of a memory region that exists within a program.

An electronic equipment pertaining to one aspect of the present invention executes a processing executing program that performs predetermined processing. The electronic equipment comprises: a memory; an allocation time setting unit that sets an allocation time of a memory region in the memory that the processing executing program is to use; and a memory leak detecting unit that detects when the memory region has not been deallocated within the allocation time.

These and other objects, features, aspects and advantages of the present invention will become more apparent from the following detailed description of the present invention when taken in conjunction with the accompanying drawings.

In this text, the terms "comprising", "comprise", "comprises" and other forms of "comprise" can have the meaning ascribed to these terms in U.S. Patent Law and can mean "including", "include", "includes" and other forms of "include".

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION OF THE PREFERRED EMBODIMENTS

Reference will now be made in detail to various embodiments of the invention, one or more examples of which are illustrated in the accompanying drawings. Each example is provided by way of explanation of the invention, and by no way limiting the present invention. In fact, it will be apparent to those skilled in the art that various modifications, combinations additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications and variations that come within the scope of the appended claims and their equivalents.

Hereinafter, description will be made of various embodiments of the present invention with reference to the accompanying drawings.

Figure 1:
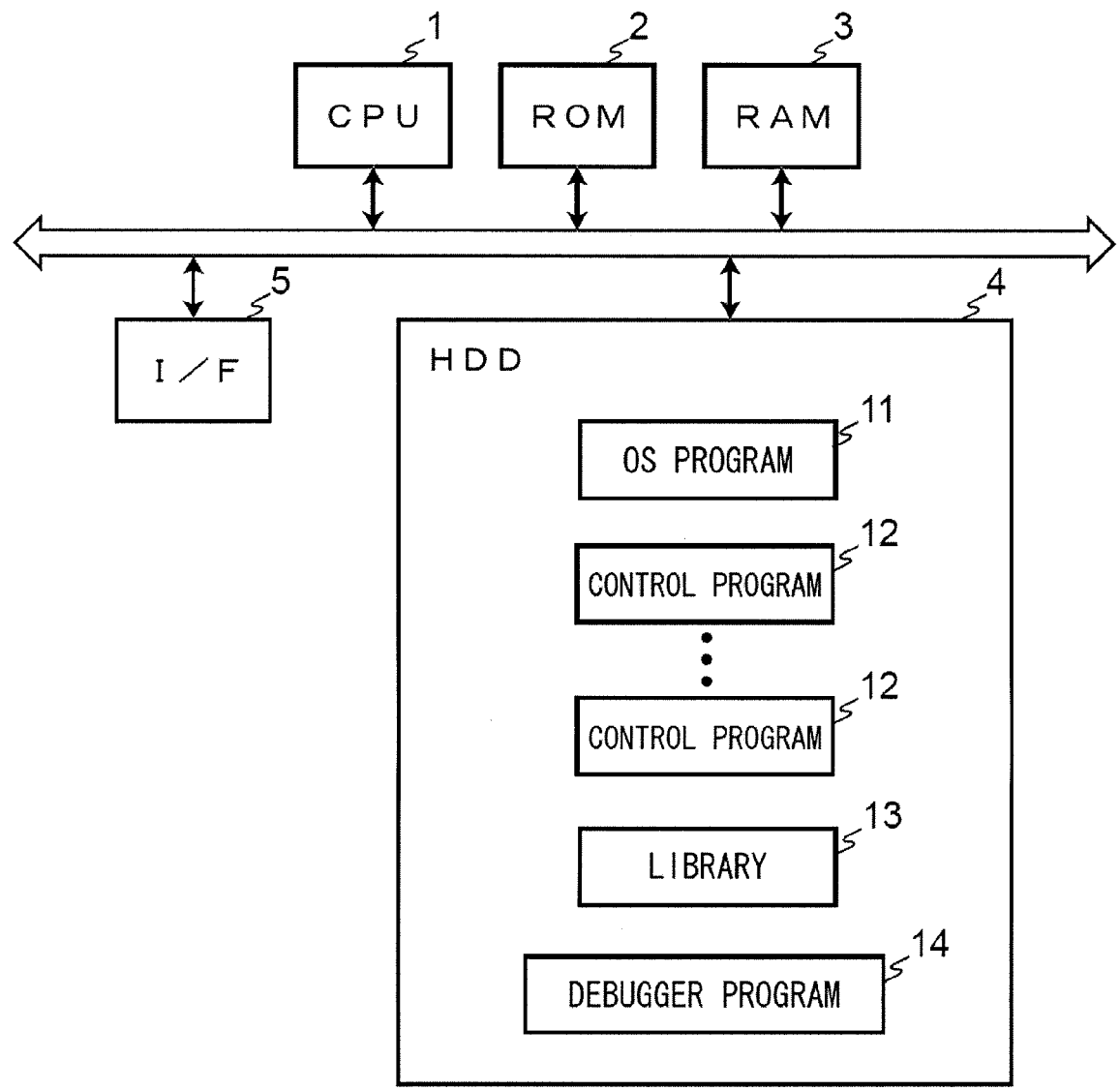
FIG. 1 is a block diagram showing the configuration of an electronic equipment pertaining to one embodiment of the present invention.

FIG. 1 is a block diagram showing the configuration of an electronic equipment pertaining to one embodiment of the present invention. In FIG. 1, CPU 1 is an arithmetic processing unit that executes a computer program and executes processing described in the computer program. ROM 2 is a nonvolatile memory in which a computer program and data are stored beforehand. RAM 3 is a memory that temporarily stores a computer program and data when that computer program is to be executed.

HDD 4 is a hard disk drive serving as a recording medium that stores an operating system (OS) program 11, control programs 12 that control devices integrated in this electronic equipment, a library 13 that includes a built-in program which performs memory management of the RAM 3, and a debugger program 14.

Interface 5 is an interface circuit that is connected to unillustrated devices integrated in this electronic equipment. Such devices are controlled via interface 5 by a program executed by CPU 1.

It will be noted that CPU 1, ROM 2, RAM 3, HDD 4 and interface 5 are interconnected by a bus, a controller and the like to configure a computer.

Figure 2:
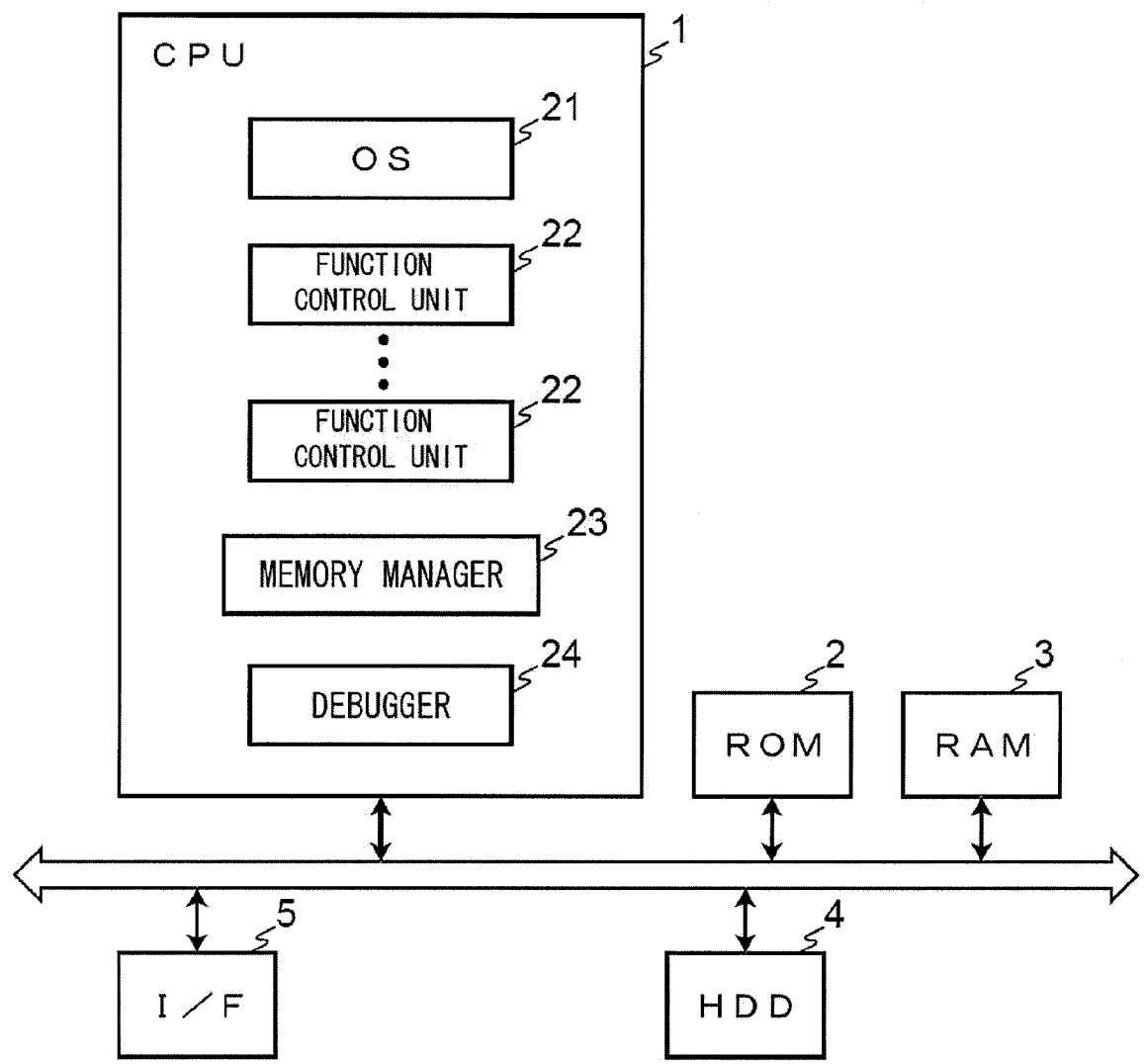
FIG. 2 is a block diagram showing a processing unit that is realized by a CPU in FIG. 1 according to one embodiment of the invention.

CPU 1 realizes various types of processing units by loading into RAM 3 and executing the OS program 11, the control program 12 serving as a processing executing program, library 13 including the memory managing program, and the debugger program 14. FIG. 2 is a block diagram showing a processing unit that is realized by CPU 1 in FIG. 1. As shown in FIG. 2, an OS 21 is realized as a result of the OS program 11 being executed, device control units 22 are realized as a result of the control programs 12 being executed, a memory manager 23 is realized as a result of the library 13 being executed, and a debugger 24 is realized as a result of the debugger program 14 being executed. It will be noted that in FIG. 2, all of the aforementioned processing units are portrayed, but because the various programs 11 to 14 are executed as needed, all of the aforementioned processing units do not have to be realized at the same time.

In FIG. 2, OS 21 is an operating system and a processing unit that provides a timer feature, an interruption feature and the like to other programs.

Further, one of the device control units 22 is a processing unit that controls one of one or plural devices within this electronic equipment. As devices within the electronic equipment, there are an operation panel including an input unit and a display unit, and a printing device and the like, and such devices are electrically connected to interface 5.

Memory manager 23 is a processing unit that dynamically allocates, in RAM 3, a memory region for storing data. The device control units 22 use and deallocate the dynamically allocated memory region. The memory manager 23 sets, when allocating a memory region in the RAM 3, an allocation time of the memory region. The memory manager 23 also detects that the memory region has not been allocated within that allocation time.

When memory manager 23 detects that a memory region has not been deallocated within a predetermined amount of time, the debugger 24, a processing unit, outputs information identifying a position of the memory region and the allocation time.

Next, operation of the above-described electronic equipment will be described.

Figure 3:
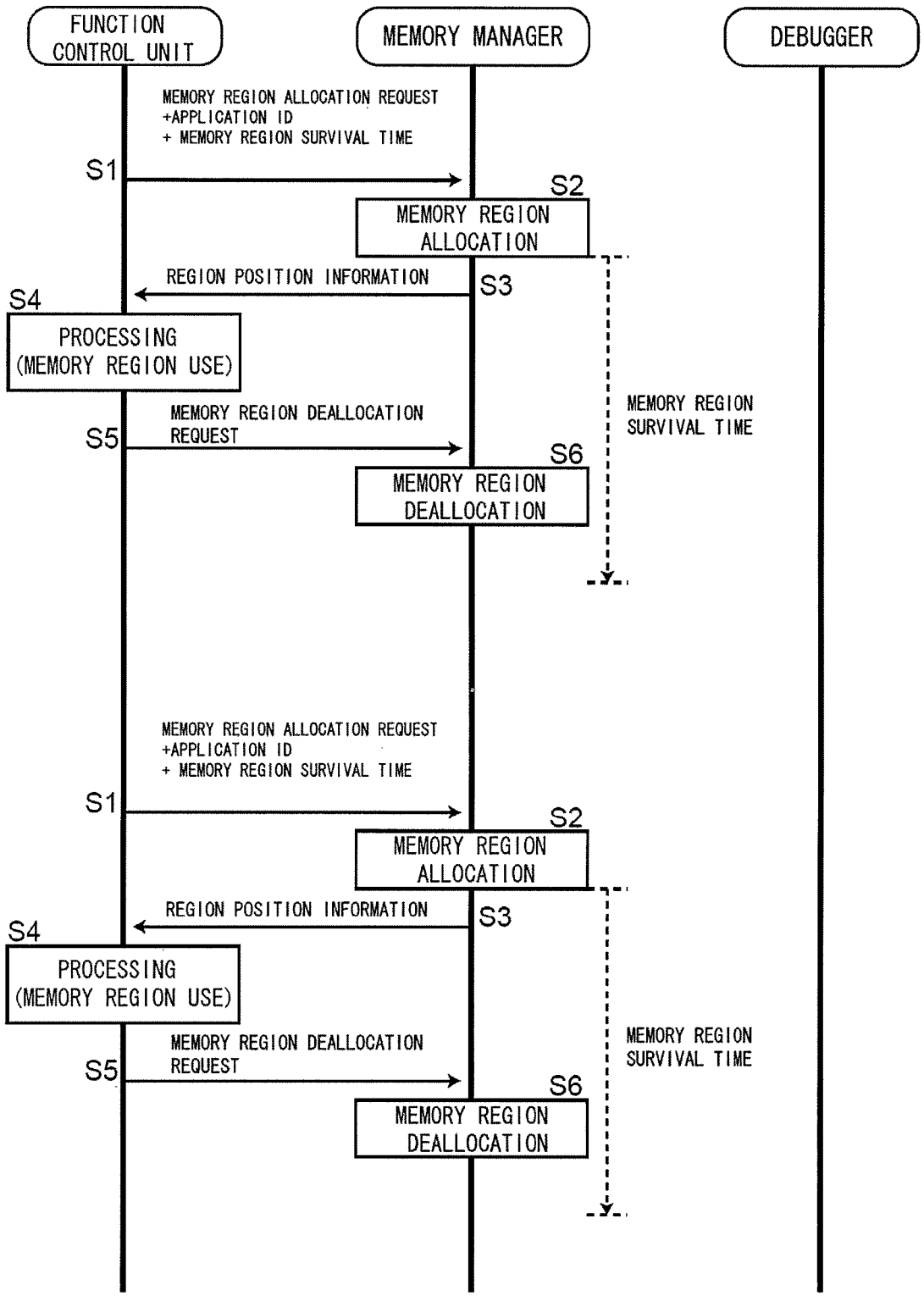
FIG. 3 is a diagram showing operation of the electronic equipment depicted in FIG. 1 and FIG. 2 when there is no memory leak of a memory region.

First, a scenario will be described where there is no memory leak of a memory region within the control program 12. FIG. 3 is a diagram describing operation of the electronic equipment shown in FIG. 1 and FIG. 2 when there is no memory leak of a memory region.

When control program 12 is executed, the device control unit 22 is realized. When a memory region that stores data to be used in certain processing is needed, a memory region allocation request is sent from the control program 12. When execution of the control program 12 progresses, then the memory region allocation request is executed. In other words, the device control unit 22 issues a memory region allocation request (step S1). Attached to this memory region allocation request is an application ID that contains identification information unique to the device control unit 22. Also attached is the allocation time for the memory region in the RAM 3. The application ID and the allocation time are designated by the programmer as an argument of a function of the memory region allocation request, for example. The aforementioned allocation time represents the amount of time in which the memory region is usable. In other words, a memory region becomes usable beginning when the memory region is allocated to until the allocation time elapses. The allocation time is configured to be a sufficiently long enough amount of time with respect to the amount of time required for the processing that uses the memory region.

When a memory region allocation request is issued, the memory manager 23 allocates a memory region of a designated size (step S2). At this time, a function within the library 13 is executed by reading the memory region allocation request function. Thus, the memory manager 23 receives the memory region allocation request, the application ID and the allocation time, and allocates a memory region.

When memory manager 23 succeeds at memory region allocation, the memory manager 23 supplies to the device control unit 22 region position information. This represents the starting position and the like of the memory region as a return value of the memory region allocation request function, for example (step S3). A pointer value representing the start of the memory region, for example, is used as region position information. Further, when the memory manager 23 succeeds at memory region allocation, it utilizes the features of the OS 21 to set the allocation time in a timer and start counting the allocation time.

When the device control unit 22 acquires the region position information of the memory region that has been allocated, then the device control unit 22 identifies the position of the region that has been allocated by that information and uses the memory region to execute predetermined processing (step S4).

A memory region deallocation request is correctly described within the control program 12 by the programmer. The memory region deallocation request is executed after completion of the predetermined processing. In other words, the device control unit 22 issues a memory region deallocation request (step S5). Attached to the memory region deallocation request is starting position information. A pointer representing the start of the region is used as the starting position information.

When the memory region deallocation request is issued, then memory manager 23 deallocates the memory region that has been designated (step S6). At this time, a function within the library 13 is executed by reading the memory region deallocation request function. Thus, the memory manager 23 receives the memory region deallocation request and the region position information and then deallocates the memory region. The memory manager 23 utilizes the features of the OS 21 to clear (nullify) the timer at the same time memory manager 23 deallocates the memory region.

Because the allocation time is set to be an amount of time longer than the amount of time required for processing (step S4) by the device control unit 23, the memory region is deallocated before the allocation time passes.

In the scenario shown in FIG. 3, the memory region is already deallocated when the allocation time elapses, so the memory manager 23 does nothing in particular.

Figure 4:
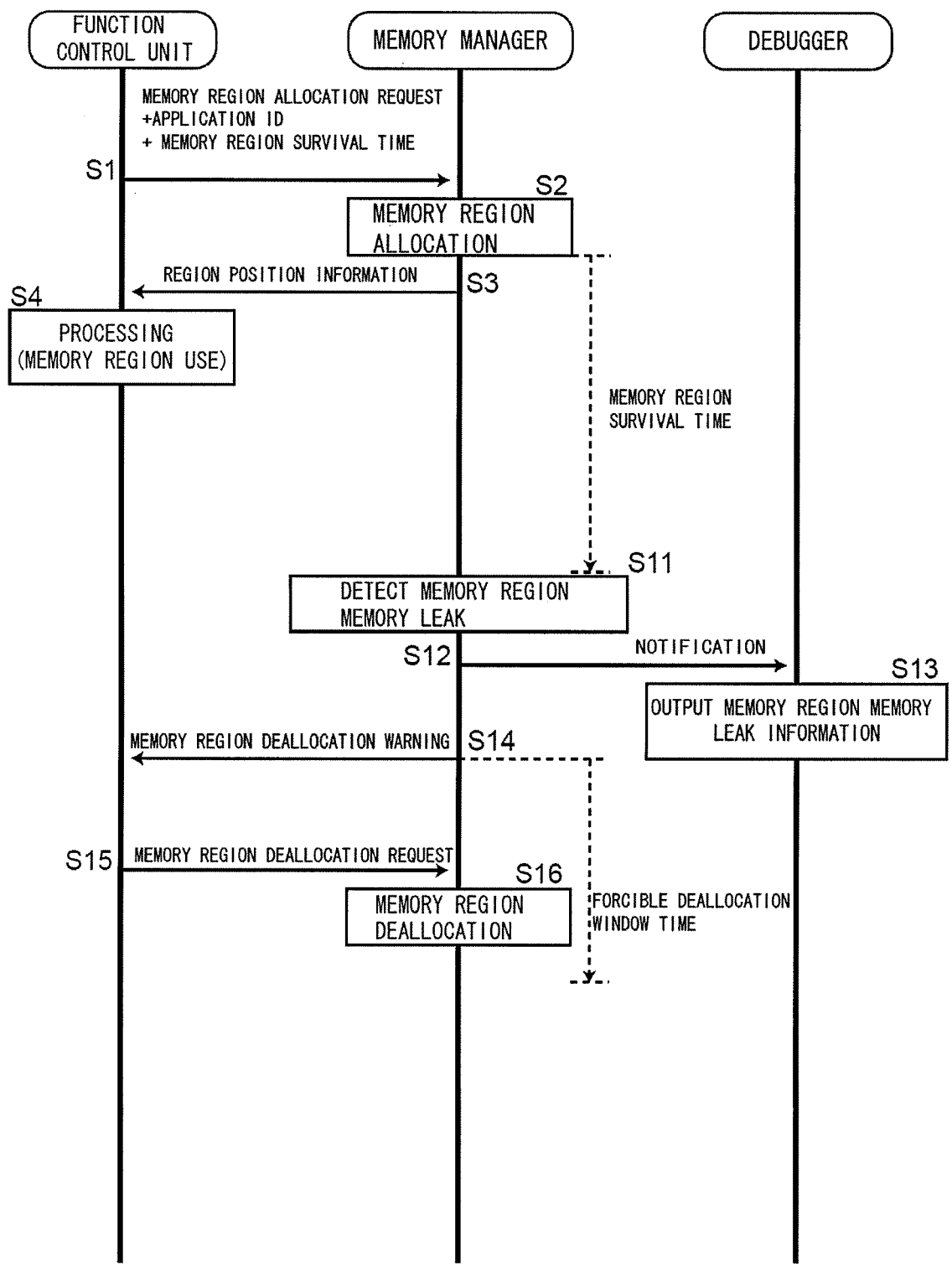
FIG. 4 is a diagram showing operation of the electronic equipment depicted in FIG. 1 and FIG. 2 when there is a memory leak of a memory region.

Next, an occurrence will be described when there is a memory leak of a memory region within the control program 12. FIG. 4 is a diagram describing operation of the electronic equipment shown in FIG. 1 and FIG. 2 when there is a memory leak of a memory region.

Similar to the situation shown in FIG. 3, memory region allocation and the like is executed (steps S1 to S4).

When there is a memory leak in a memory region, a memory region deallocation request is not issued even when processing that uses a dynamically allocated memory region is completed (step S4). Consequently, the allocation time ends up elapsing without a memory region deallocation request being issued. For this reason, when the allocation time elapses by the timer that was set at the time of memory region allocation, then interruption by the OS 21 occurs. Thus, memory manager 23 detects a memory leak of the memory region that has been allocated (step S1).

In this manner, when memory manager 23 detects a memory leak of the memory region, memory manager 23 notifies the debugger 24 of the occurrence of a memory region memory leak (step S12). At this time, the debugger 24 is also notified of the application ID related to the memory region that has not been deallocated, the allocation time, the memory starting position information and the memory size. When the debugger 24 is not being executed by another process, then the memory manager 23 may perform notification by inter-process transmission. Further, when the debugger 24 is executed within the same process, a function within the debugger program 14 is called. The debugger 24 outputs the information of which it has been notified to an unillustrated display device and causes the display device to display the information. Further the debugger 24 may alternatively output the information to an unillustrated external device connected to this electronic equipment. The debugger 21 may output the information to an unillustrated nonvolatile recording medium and cause the recording medium to record the information. It will be noted that, rather than using the debugger 24, the memory manager 23 itself may output the information of which it has been notified to an unillustrated display device and cause the display device to display the information, or output the information to an unillustrated external device connected to this electronic equipment, or output the information to an unillustrated nonvolatile recording medium and cause the recording medium to record the information. The device control unit 22 in which there is a memory region memory leak—that is, the control program 12—is identifiable by the application ID.

Further, when the memory manager 23 detects a memory leak in a memory region, memory manager 23 identifies the device control unit 22 having the memory leak by the application ID that was supplied at the time of the request to allocate the memory region. The memory manager 23 then supplies a memory region deallocation warning to that device control unit 22 (step S14). At this time, a memory region deallocation function of a predetermined name is used in the event of a memory leak. The function is included beforehand within the control program 12 and is called. This function is described beforehand within the control program 12 by the programmer. Further, when the memory manager 23 supplies the memory region deallocation warning, the memory manager 23 utilizes the features of the OS 21. The features of the OS21 allow the setting of forcible deallocation window time as a predetermined time period in a timer and causing the timer to start counting the forcible deallocation window time. This forcible deallocation window time is stored as a predetermined initialization value in the HDD 4, and is configured to be an amount of time that is sufficient with respect to the amount of time necessary to deallocate this memory region.

When the device control unit 22 receives the memory region deallocation warning, the device control unit 22 then issues a memory region deallocation request (step S15). At this time, a memory region deallocation function of a predetermined name to be used in the event of a memory leak which is included beforehand in the control program 12 is executed. As a result, memory region function described in that function is executed. The memory manager 23 utilizes the features of the OS 21 to clear (nullify) the timer at the same time the memory manager 23 deallocates the memory region.

Because the forcible deallocation window time is set to be an amount of time that is longer than the amount of time required for memory region deallocation, the memory region is thus deallocated before the elapse of the forcible deallocation window time. In other words, the memory region is deallocated even though it is delayed from the normal timing when it normally would be deallocated.

In the scenario shown in FIG. 4, the memory region is already deallocated when the forcible deallocation window time elapses, so the memory manager 23 does nothing in particular.

In this manner, when a memory leak of a memory region occurs, the device control unit 22 and the debugger 24 are notified. Additionally, the device control unit 22 and the debugger 24 receive this notification, and the memory region is deallocated by the device control unit 22. Further, information of the memory leak of the memory region is outputted for debugging by the debugger 24.

Figure 5:
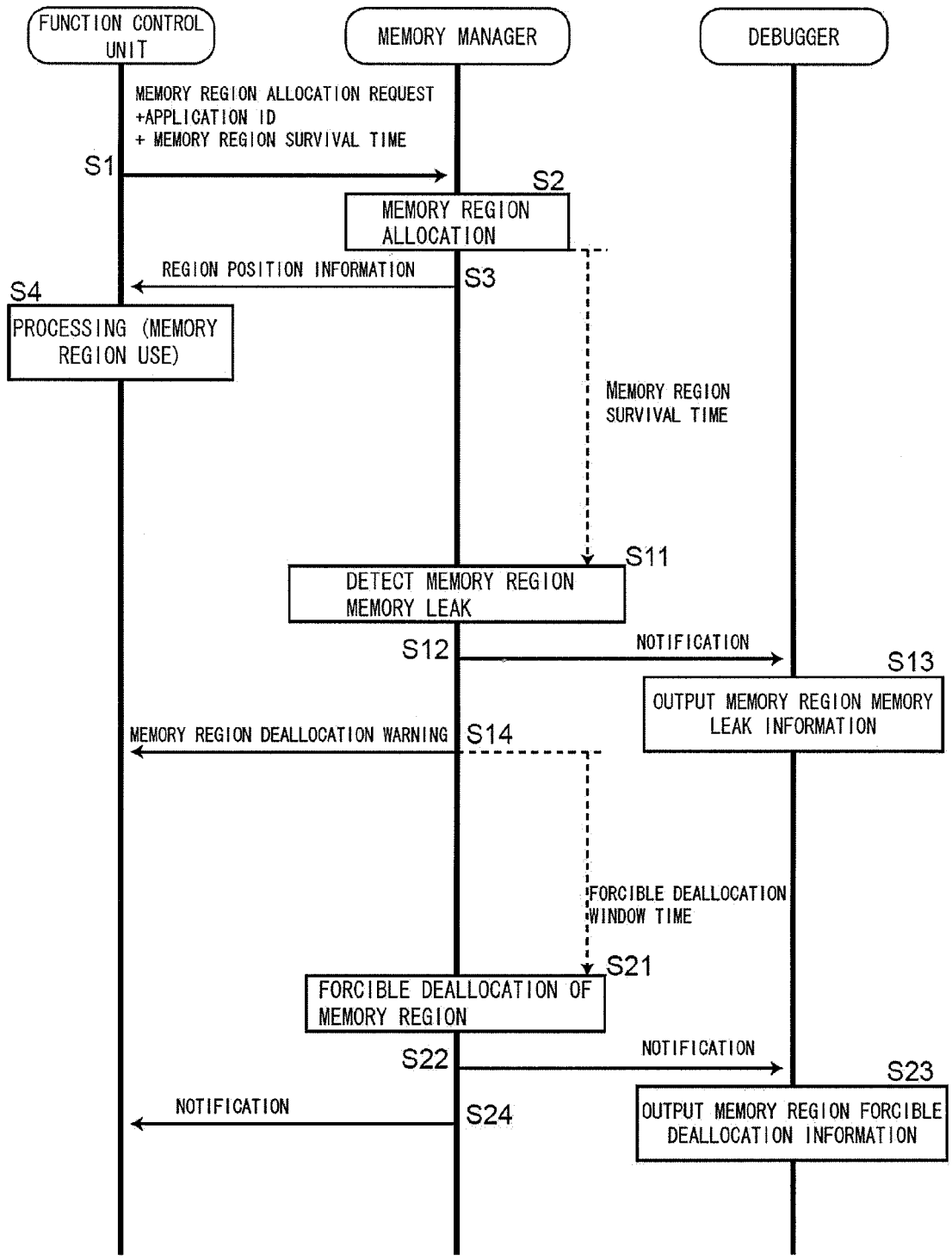
FIG. 5 is a diagram describing operation of the electronic equipment shown in FIG. 1 and FIG. 2 when there is a memory leak of a memory region and a memory region deallocation function of a predetermined name to be used in the event of a memory leak does not function normally, according to another embodiment of the present invention.
Figure 6:
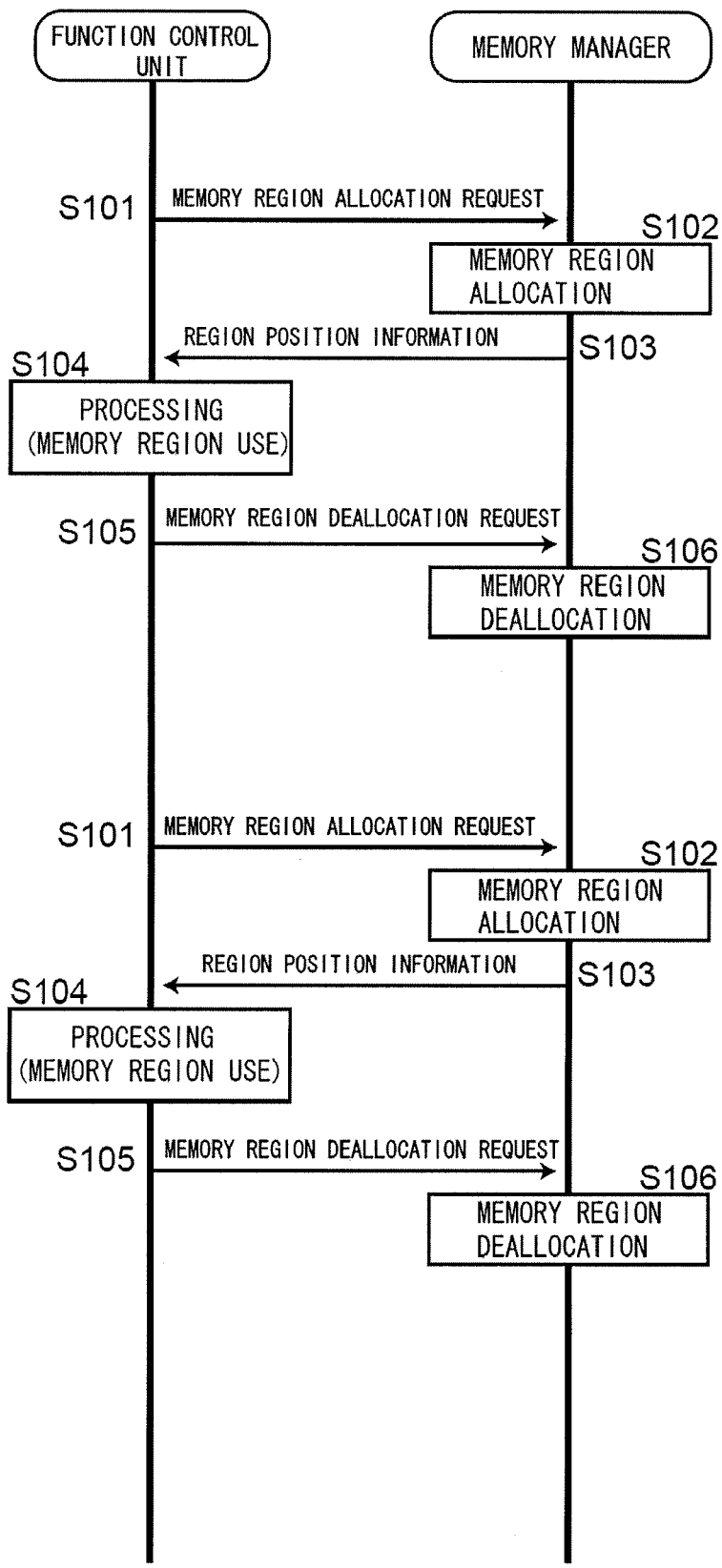
FIG. 6 is a flowchart showing allocation and deallocation of a dynamic memory region according to a further embodiment of the present invention.
Figure 7:
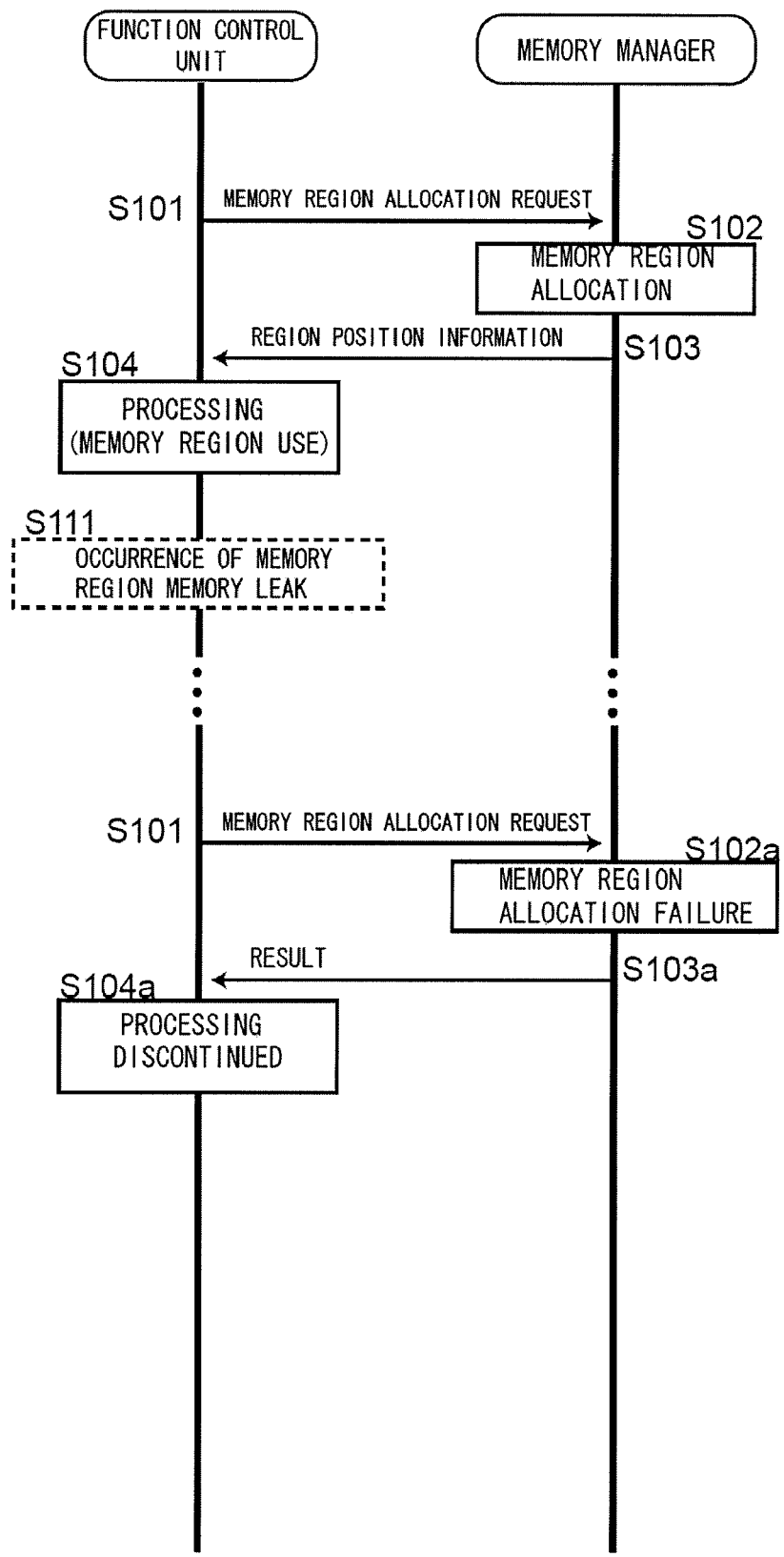
FIG. 7 is a flowchart describing the occurrence of a memory leak.

Next, a scenario will be described where a memory region deallocation function of a predetermined name to be used in the event of a memory leak does not function normally. A program bug or the like is conceivable as a cause of this. FIG. 5 is a diagram describing operation of the electronic equipment shown in FIG. 1 and FIG. 2 when there is a memory leak of a memory region and a memory region deallocation function of a predetermined name to be used in the event of a memory leak does not function normally.

In this situation, even when a memory region deallocation warning is supplied, the device control unit 22 does not issue a memory region deallocation request. At this time, even when a memory region deallocation function of a predetermined name is called, it does not function normally, so nothing is executed. Consequently, the forcible deallocation window time ends up elapsing and interruption by the OS 21 occurs without a memory region deallocation request being issued. The memory manager 23 detects, by the interruption by the OS 21, that the memory region that is the target of the warning has not been deallocated.

When the memory manager 23 detects that the memory region that is the target of the warning has not been deallocated, it deallocates the memory region even if there is no memory region deallocation request (step S21).

In this manner, when the memory manager 23 forcibly deallocates the memory region, the memory manager 23 then notifies the debugger 24 of the occurrence of forcible deallocation of the memory region (step S22). At this time, the debugger 24 is also notified of the application ID relating to the forcibly deallocated memory region, the allocation time, the memory starting position information and the memory size. When the debugger 24 is being executed by another process, the memory manager 23 may perform the notification by inter-process transmission. Further, when the debugger 24 is executed within the same process, a function within the debugger program 14 is called. The debugger 24 outputs the information of which it has been notified to an unillustrated display device and causes the display device to display the information. Alternatively, the debugger outputs the information to an unillustrated external device connected to this electronic equipment, or outputs the information to an unillustrated nonvolatile recording medium and causes the recording medium to record the information. It will be noted that, rather than using the debugger 24, the memory manager 23 itself may also output the information of which it has been notified to an unillustrated display device, to an unillustrated external device connected to this electronic equipment, or to an unillustrated nonvolatile recording medium. The device control unit 22 in which forcible deallocation of a memory region has occurred—that is, the control program 12—is identifiable by the application ID.

Further, when the memory manager 23 forcibly deallocates the memory region, the memory manager 23 identifies, by the application ID supplied at the time of the request to allocate the memory region, the device control unit 22 whose forcibly deallocated memory region has been allocated. The memory manager 23 then supplies a forcible deallocation notification to that device control unit 22 (step S24).

In this manner, even when a memory region deallocation function of a predetermined name which is used in the event of a memory leak does not function normally, the memory manager 23 eventually forcibly deallocates the memory region.

In the above-described embodiment of the present invention, the memory manager 23 serves as an allocation time setting unit. When a memory region in the RAM 3 is being allocated, the allocation time setting unit sets an allocation time for the memory region. Additionally, the memory manager 23 serving as a memory leak detecting unit detects that the memory region has not been deallocated within the allocation time. Thus, by executing a program, a memory leak of a memory region present in the program can be automatically and quantitatively detected. Therefore, this leads to an improvement in software quality.

Further, according to the above-described embodiment of the present invention, the debugger 24 serving as a memory leak information outputting unit outputs, when it has been detected by the memory manager 23 that the memory region has not been deallocated within the allocation time, information identifying a position of the memory region and the allocation time. Thus, by executing a program, a memory leak of a memory region present in the program can be detected. Also, the memory region in which a memory leak has occurred can be identified on the basis of the memory leak information. Therefore, debugging work relating to a memory leak can be alleviated.

Further, according to the above-described embodiment of the present invention, the memory manager 23 serves as a forcible deallocation unit. The memory manager 23 forcibly deallocates when it detects that the memory region has not been deallocated within the allocation time of the memory region. Thus, even if a memory leak of a memory region remains in the actual equipment, it can be ensured that the equipment is not error-stopped by the memory leak.

Moreover, according to the above-described embodiment, the debugger 24 serves as a forcible deallocation information outputting unit. The debugger 24 outputs information identifying the position of the memory region and the allocation time when the memory region has been forcibly deallocated by the memory region 23. Thus, the memory region in which a memory leak has occurred can be identified on the basis of the forcible deallocation information. Therefore, debugging work relating to a memory leak can be alleviated.

It will be noted that, although the preceding embodiment is a preferred example of the present invention, the present invention is not limited to this and may be variously modified and altered in a range that does not depart from the gist and the spirit of the present invention.

For example, the invention may also be configured such that when a memory region that is not scheduled for deallocation is to be allocated, the allocation time may be made zero. When the allocation time is zero, the memory manager 23 does not set the aforementioned timer so that interruption by the OS 21 after the lapse of the memory allocation time would not occur.

Furthermore, with respect to the configuration of the above-described embodiment, electronic equipment in the development stage and actual equipment are usable.

Additionally, in the above-described embodiment, the GNU Project Debugger (GDB) may also be used as the debugger. Although the debugger 24 is realized as a result of the debugger program 14 being executed by the CPU 1, the debugger alternatively may be configured as an external device that is communicable with this electronic equipment or terminal software executed by that external device.

From the above embodiment, the present invention is summarized as follows.

An electronic equipment pertaining to an aspect of the present invention capable of executing a processing executing program that performs predetermined processing. The electronic equipment comprises: memory; an allocation time setting unit; and a memory leak detecting unit. The allocation setting unit sets an allocation time of a memory region in the memory that the processing executing program is to use. The memory leak detecting unit detects that the memory region has not been deallocated within the allocation time.

Thus, by executing the program, a memory leak of a memory region that exists within the program can be detected.

Also, the electronic equipment may, in addition to the above-described electronic equipment, also be configured to comprise a memory leak information outputting unit. When it has been detected by the memory leak detecting unit that the memory region has not been deallocated within the allocation time, the memory leak information outputting unit outputs information identifying a position of the memory region and the allocation time.

Thus, by executing the program, a memory leak of a memory region that exists within the program can be detected, and the memory region in which a memory leak has occurred can be identified on the basis of the memory leak information. Therefore, debugging work relating to the memory leak can be alleviated.

Moreover, the electronic equipment may, in addition to any of the above-described electronic equipment, also be configured to comprise a forcible deallocation unit. Therefore, when it has been detected by the memory leak detecting unit that the memory region has not been deallocated within the allocation time, the forcible deallocation unit forcibly deallocates the memory region.

Thus, even when there is a memory region memory leak in the actual equipment, it can be ensured that the equipment is not error-stopped by the memory leak.

The electronic equipment may, in addition to any of the above-described electronic equipment, be configured to comprise a forcible deallocation information outputting unit that, when the memory region has been forcibly deallocated by the forcible deallocation unit, outputs information identifying a position of the memory region and the allocation time.

Thus, a memory region in which a memory leak has occurred can be identified on the basis of the forcible deallocation information. Therefore, debugging work relating to the memory leak can be alleviated.

Furthermore, the electronic equipment may, in addition to any of the above-described electronic equipment, be configured as follows. In this case, the electronic equipment further comprises a processing unit and a memory manger. The processing unit executes a predetermined processing that is realized as a result of all or part of the processing executing program being executed. The memory manager allocates the memory region. Additionally, when a memory region allocation request is issued by the processing unit, the memory manager allocates the requested memory region. The allocation time setting unit associates, with the processing unit, and sets the allocation time of the memory region on the basis of the memory region allocation request. When the memory region has not been deallocated within the allocation time after allocation of the memory region by the memory manager, the memory leak detecting unit issues a notification. The notification is issued to the processing unit that issued the memory region allocation request indicating that the memory region has not been deallocated within the allocation time. When the processing unit receives the notification from the memory leak detecting unit, the processing unit issues, to the memory manager, a memory region deallocation request that causes the memory manager to deallocate the memory region.

Moreover, the electronic equipment may, in addition to any of the above-described electronic equipment, be configured as follows. The electronic equipment may further comprise a second memory leak detecting unit. If and when the memory region has not been deallocated within the allocation time after allocation of the memory region by the memory manager, the second memory leak detecting unit detects that the memory region has not been deallocated within a predetermined time period by the memory region deallocation request of the processing unit. The electronic equipment further comprises a forcible deallocation unit that, when it has been detected by the second memory leak detecting unit that the memory region has not been deallocated within the predetermined time period, forcibly deallocates the memory region.

A storage medium pertaining to the present invention stores a memory managing program for causing a computer of an electronic equipment that executes a processing executing program that performs predetermined processing to function as an allocation time setting unit that stores data in a memory, dynamically allocates a memory region that the processing executing program is to use, and at that time sets an allocation time of the memory region; and a memory leak detecting unit that detects that the memory region has not been deallocated within the allocation time.

A method of executing a program according to another aspect of present invention performs predetermined processing. The method comprises steps of (1) processing the predetermined processing as part of an executing program, (2) dynamically allocating a memory region in memory for the processing executing program to use, (3) setting an allocation time corresponding to the dynamically allocated memory region, and (4) detecting whether the dynamically allocated memory has been deallocated within the allocation time.

Thus, by executing the processing executing program, a memory leak of a memory region that exists within the processing executing program can be detected.

In addition, the memory managing program is provided in a computer readable recording medium including but not limited to a ROM (Read-Only Memory), a hard disk, a flexible disk, a memory card, or an optical disk.

Having thus described in detail preferred embodiments of the present invention, it is to be understood that the invention defined by the foregoing paragraphs is not to be limited to particular details and/or embodiments set forth in the above description, as many apparent variations thereof are possible without departing from the spirit or scope of the present invention.

What is claimed is:

1. An electronic equipment that executes a processing executing program that performs predetermined processing, the electronic equipment comprising:
   a memory;
   an allocation time setting unit that sets an allocation time for a memory region in the memory that the processing executing program is to use and that starts counting the allocation time when the memory region is allocated in the memory;
   a memory leak detecting unit that detects an occurrence of the memory region not having been deallocated within the allocation time;
   a forcible deallocation unit that, when the memory leak detecting unit detects the occurrence of the memory region not having been deallocated within the allocation time, forcibly deallocates the memory region;
   a forcible deallocation window time setting unit that sets a forcible deallocation window time for suspending a forcible deallocation of the memory region and that starts counting the forcible deallocation window time when the memory leak detecting unit detects the occurrence of the memory region not having been deallocated within the allocation time; and
   a second memory leak detecting unit that detects the occurrence of the memory region not having been deallocated within the forcible deallocation window time, wherein
   the forcible deallocation unit forcibly deallocates the memory region when it has been detected by the second memory leak detecting unit that the memory region has not been deallocated within the forcible deallocation window time.

2. The electronic equipment according to claim 1, further comprising a memory leak information outputting unit that, when the memory leak detecting unit detects the occurrence of the memory region not having been deallocated within the allocation time, outputs information identifying a position of the memory region and the allocation time.

3. The electronic equipment according to claim 1, further comprising a forcible deallocation information outputting unit that, when the memory region has been forcibly deallocated by the forcible deallocation unit, outputs information identifying a position of the memory region and the allocation time.

4. An electronic equipment that executes a processing executing program that performs predetermined processing, the electronic equipment comprising:
   a memory;
   an allocation time setting unit that sets an allocation time for a memory region in the memory that the processing executing program is to use and that starts counting the allocation time when the memory region is allocated in the memory;
   a memory leak detecting unit that detects an occurrence of the memory region not having been deallocated within the allocation time;
   a processing unit that executes the predetermined processing and that is realized as a result of all or part of the processing executing program being executed,
   a memory manager that allocates the memory region;
   a second memory leak detecting unit that, when the memory region has not been deallocated within the allocation time after allocation of the memory region by the memory manager, detects the occurrence of the memory region not having been deallocated within a predetermined time period by the memory region deallocation request of the processing unit; and
   a forcible deallocation unit that, when it has been detected by the second memory leak detecting unit that the memory region has not been deallocated within the predetermined time period, forcibly deallocates the memory region wherein when a memory region allocation request is issued by the processing unit, the memory manager allocates the requested memory region, and the allocation time setting unit associates, with the processing unit, and sets the allocation time of the memory region on the basis of the memory region allocation request, wherein
   when the memory region has not been deallocated within the allocation time after allocation of the memory region by the memory manager, the memory leak detecting unit issues, to the processing unit a notification indicating that the memory region has not been deallocated within the allocation time; and
   when the memory region has not been deallocated within the allocation time after allocation of the memory region by the memory manager, the predetermined time period is set in a timer and the timer starts counting the predetermined time period.

5. The electronic equipment of claim 4 wherein when the processing unit receives the notification from the memory leak detecting unit, the processing unit issues, to the memory manager, a memory region deallocation request that causes the memory manager to deallocate the memory region.

* * * * *